United States Patent [19]

Hammer et al.

[11] Patent Number: 4,749,155
[45] Date of Patent: Jun. 7, 1988

[54] METHOD OF MAKING WING BOX COVER PANEL

[75] Inventors: Robert H. Hammer, Kirkland; Raymond E. Pearson, Redmond, both of Wash.

[73] Assignee: The Boeing Company, Seattle, Wash.

[21] Appl. No.: 781,776

[22] Filed: Sep. 30, 1985

[51] Int. Cl.⁴ .............................. B64C 3/20; B64C 3/24
[52] U.S. Cl. ..................................... 244/123; 244/119
[58] Field of Search ............... 244/123, 124, 133, 119, 244/120; 52/249, 602, 630, 782, 802, 821, 824; 156/560, 554

[56] References Cited

U.S. PATENT DOCUMENTS

| | | | |
|---|---|---|---|
| 3,028,292 | 4/1962 | Hinds | 244/123 |
| 3,096,958 | 7/1963 | Koontz | 244/123 |
| 3,519,228 | 7/1970 | Windecker | 244/123 |
| 3,645,829 | 2/1972 | Palfrevman et al. | 156/441 |
| 3,768,760 | 10/1973 | Jensen | 244/123 |
| 3,780,969 | 12/1973 | Nussbaum et al. | 244/123 |
| 3,902,944 | 9/1975 | Ashton et al. | 156/156 |
| 3,962,506 | 6/1975 | Dunahoo | 428/158 |
| 3,995,080 | 11/1976 | Cogburn et al. | 428/35 |
| 3,995,081 | 11/1976 | Fant et al. | 428/119 |
| 4,310,132 | 1/1982 | Robinson et al. | 244/119 |
| 4,461,669 | 7/1984 | Dontscheff | 156/574 |
| 4,475,976 | 10/1984 | Mittelstadt et al. | 156/286 |

FOREIGN PATENT DOCUMENTS

| | | | |
|---|---|---|---|
| 1241269 | 5/1967 | Fed. Rep. of Germany | 244/123 |
| 212993 | 3/1924 | United Kingdom | 244/123 |

*Primary Examiner*—Joseph F. Peters, Jr.
*Assistant Examiner*—Rodney Corl
*Attorney, Agent, or Firm*—Joan H. Pauly

[57] ABSTRACT

A plurality of channel-shaped members (12) are positioned longitudinally along the inner surface of an outer skin (6). Each member (12) has a web (14) and two flanges (16). Members (12) are positioned laterally contiguously to each other so that, when outer skin (6) and members (12) are cured together, webs (14) form an inner skin portion (8) and adjacent flanges (16) form blade stiffeners (10). A generally L-shaped member (22) is positioned to extend longitudinally along the inner surface of outer skin (6) adjacent to each side edge of skin (6), with one leg (26) of member (22) contiguous to a modified flange (16') of channel-shaped member (12'). When outer skin (6) and members (12,12',22) are cured together, leg (26) and flange (16') form a spar chord (20). Reinforcing fibers in skin (6,8) resist torsional shear. Reinforcing fibers in stiffeners (10) and spar chords (20) resist bending loads.

3 Claims, 1 Drawing Sheet

U.S. Patent  Jun. 7, 1988  4,749,155
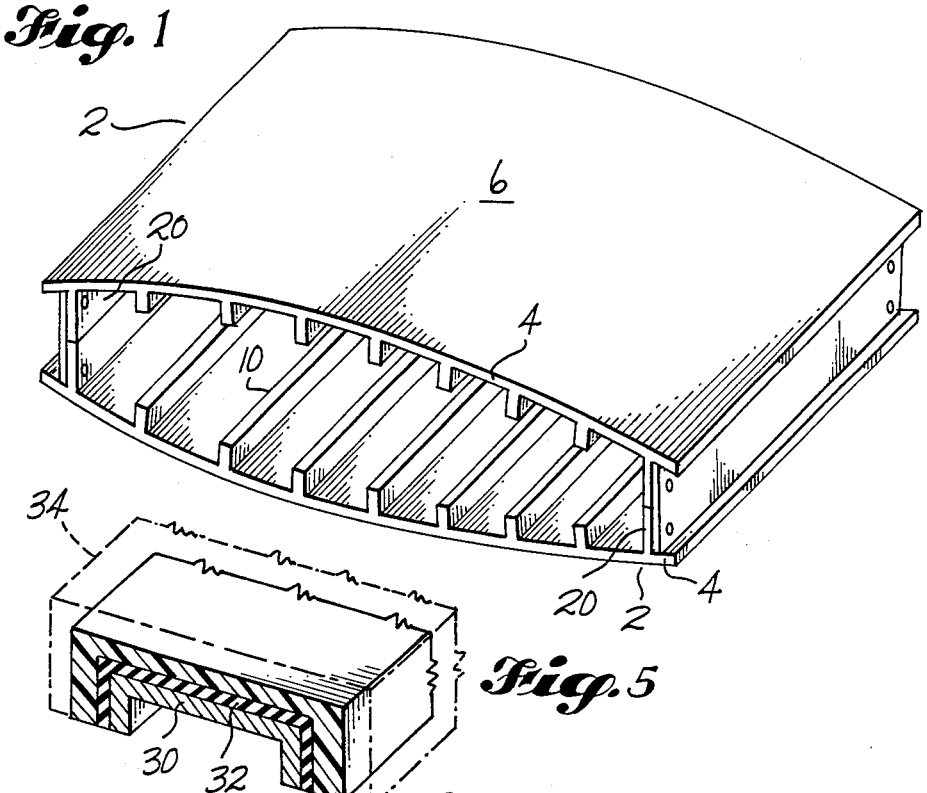
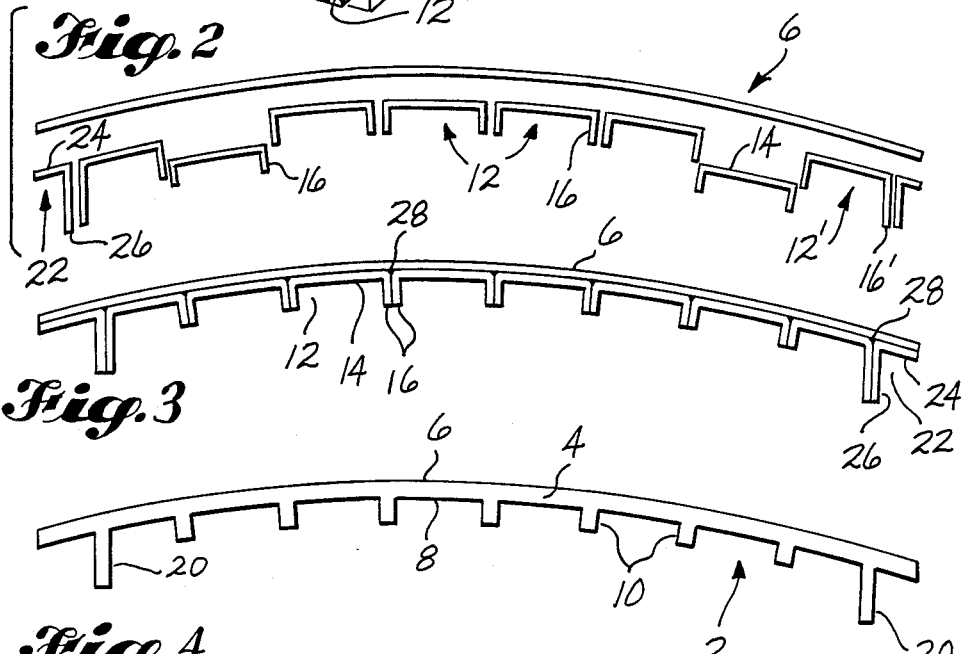
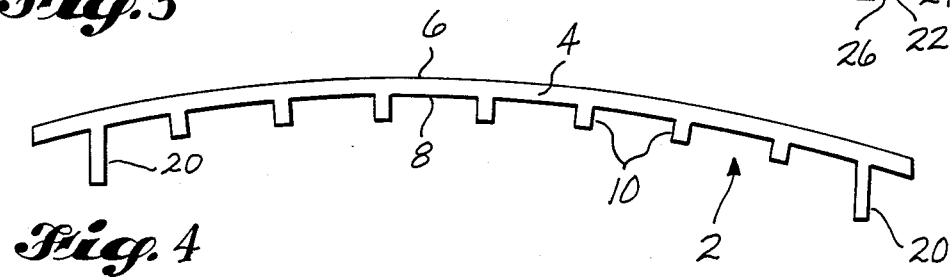

4,749,155

METHOD OF MAKING WING BOX COVER PANEL

GOVERNMENT RIGHTS

The government has rights in this invention.

TECHNICAL FIELD

This invention relates to reinforced panels for aircraft and, more particularly, to a fiber reinforced composite material wing/stabilizer box cover panel that is integrally stiffened to resist torsional shear and bending loads.

BACKGROUND ART

With the increasing use of composite materials in the manufacture of aircraft components, a number of problems have arisen in connection with the application to such materials of design principles developed for conventional aluminum construction. Such design principles involve the use of numerous mechanical fasteners and the inclusion of multiple details. Advanced composite materials do not readily lend themselves physically or economically to extensive use of mechanical fasteners and highly detailed designs. The inclusion of multiple details in a composite material component increases the cost of manufacture to unacceptably high levels and makes the application of automated procedures difficult, if not impossible. Mechanical fasteners are not physically well suited for composite material components, and their use with such components tends to detract from the advantages of the unidirectional properties of advanced composite fibers. These problems have created a need for developing new techniques for economically producing composite material components, especially such components that are required to be load resisting.

In recent years there have been a number of proposals relating to the structure and manufacture of composite material components. Some of these proposals involve the use of thermosetting adhesives instead of mechanical fasteners. Manufacturing processes that employ thermosetting adhesives generally require the separate forming and curing of the components and a further heating process to set the adhesives. Such multiple step processes have the disadvantages of being time consuming and expensive to carry out. Other proposals involve the separate forming of elements of a component and the curing together of the elements to form the desired structure. A serious problem encountered in connection with known composite material components embodying both approaches—bonding by adhesives and bonding by curing—has been the tendency for one part of the component to be peeled away from an adjacent part of the component when the component is subjected to stress forces. Recent proposals for overcoming such peel tendencies have the serious drawback of being quite complicated and expensive to carry out.

An aircraft component that is at least partially formed from composite materials and/or a process for making such a component is disclosed in each of the following U.S. Pat. Nos.:
3,096,958, granted July 9, 1963, to R. D. Koontz;
3,519,228, granted July 7, 1970, to L. J. Windecker;
3,645,829, granted Feb. 29, 1972, to Palfreyman et al;
3,768,760, granted Oct. 30, 1973, to L. C. Jensen;
3,780,969, granted Dec. 25, 1973, to Nussbaum et al;
3,902,944, granted Sept. 2, 1975, to Ashton et al;
3,962,506, granted June 8, 1976, to E. O. Dunahoo;
3,995,080, granted Nov. 30, 1976, to Cogburn et al;
3,995,081, granted Nov. 30, 1976, to Fant et al; and
4,310,132, granted Jan. 12, 1982, to Robinson et al.

Koontz discloses a sheet material with a plurality of generally planar ribs spaced along one of its surfaces. The sheet material is made from a continuous filament composite material, and the ribs are made from a composite material with discontinuous, randomly-disposed filaments. The ribs are positioned on the sheet material during a rib molding process, and the sheet material and the ribs are cured together to bond them together.

Windecker discloses an airfoil structure that includes a foamed core, a composite skin, and spaced planar spars made from laminates of reinforced plastic and metal. These three elements are "adhered" together.

Cogburn et al and Fant et al each disclose a composite material plicated structural beam with a fairly complex design that is described as being peel resistant. Each of the elements of the beam is formed separately, and then the elements are assembled and cured together to form the beam. The use of a destructible mandrel in the curing process is described.

Robinson et al disclose a fuselage structure having a number of spaced stringers and reinforcing members. The composite skin of the structure has layers oriented at plus and minus 45° degrees to the fuselage longitudinal axis, and the stringers and reinforcers have layers oriented at 0° to such axis. The stringers and reinforcing members are secured to the skin by means of mechanical fasteners, brazing, or compacting.

Nussbaum et al disclose a wing case for airfoils having a laminated skin and spaced apart metal spars and ribs. The spars and ribs are secured to the skin by mechanical means. The layers of the laminated skin are oriented at 0°, 90°, and plus and minus 45° to the span of the wing.

Jensen discloses a laminated composite skin for covering a structural component. The layers of the skin are oriented at a plurality of angles, and some of the layers have fibers oriented in more than one direction.

Palfreyman et al disclose apparatus for producing composite material by a filament winding process. The manufacture of an airfoil shape is described. Ashton et al disclose a filament winding process for forming a flexible sheath which is then removed from the mandrel and molded into a desired noncircular shape.

Dunahoo discloses a composite material airfoil with a multichambered cellular structure. The manufacture of the airfoil involves multiple winding and curing processes.

The above patents and the prior art that is discussed and/or cited therein should be studied for the purpose of putting the present invention into proper perspective relative to the prior art.

DISCLOSURE OF THE INVENTION

A subject of this invention is an integrally stiffened panel for use in an aircraft. According to an aspect of the invention, the panel comprises a skin including an outer skin portion and an inner skin portion, and a plurality of stiffeners projecting from and substantially normal to the inner surface of the inner skin portion. The inner skin portion and the stiffeners are formed by a plurality of channel-shaped members extending longitudinally along the inner surface of the outer skin portion. Each of these members has a generally U-shaped cross section with two flange portions and a web portion that is contiguous to the inner surface of the outer skin portion. The web portions are laterally contiguous to each other to form the inner skin portion. Adjacent flange portions of each pair of adjacent channel-shaped members are laterally contiguous to each other to form one of the stiffeners. The skin includes a plurality of layers of fiber reinforced composite material having reinforcing fibers oriented to resist torsional shear on the panel. Each of the stiffeners includes a plurality of layers of fiber reinforced composite material having reinforcing fibers oriented to resist bending loads on the panel. The outer skin portion and the channel-shaped members are cured together into a single integrated load resisting structure. Preferably, such fibers in the skin are oriented at angles of substantially plus and minus 45° to the longitudinal axis of the panel, and such fibers in the stiffeners are oriented at substantially 0° to such axis.

According to another aspect of the invention, the outer skin portion extends laterally beyond the laterally outermost channel-shaped member on each side of the panel, and a generally L-shaped member is provided on each side of the panel. Each L-shaped member has a first leg and a second leg. The first leg is contiguous to the inner surface of the outer skin portion and laterally contiguous to the web portion of said outermost channel-shaped member to form a continuation of the inner skin portion. The second leg is laterally contiguous to the laterally outer flange portion of said outermost channel-shaped member to form therewith a longitudinal frame member that projects from and is generally normal to the inner surface of the inner skin portion. The outer skin portion, channel-shaped members, and L-shaped members are cured together into a single integrated load resisting structure.

Another subject of the invention is a method of producing an integrally stiffened panel for use in an aircraft. According to an aspect of the invention, the method comprises forming an outer skin portion, forming a plurality of channel-shaped members, positioning such members longitudinally along the inner surface of the outer skin portion, and curing the outer skin portion and such members together into a single integrated load resisting structure. Forming the outer skin portion includes laying a plurality of layers of fiber reinforced composite material and orienting reinforcing fibers in the layers to resist torsional shear on the panel. Forming the channel-shaped members includes laying a plurality of layers of fiber reinforced composite material for each member, shaping the layers, and orienting reinforcing fibers in the layers. The layers are shaped into an elongated shape having a generally U-shaped cross section with a web portion and two flange portions. Reinforcing fibers in the flange portions are oriented to resist bending loads on the panel, and reinforcing fibers in the web portions are oriented to resist torsional shear on the panel. When the members are positioned on the outer skin portion, the web portions of the members are positioned to be contiguous to the inner surface of the outer skin portion and each other, and adjacent flange portions are positioned to be contiguous to each other. When the finished panel is formed by curing, the outer skin portion and the web portions form an integrated skin and each pair of adjacent flange portions form a stiffener projecting from the inner surface of said skin.

The method and apparatus of the invention provide an integrally stiffened panel that efficiently makes use of the unidirectional properties of advanced composite fibers. Panels of the invention are relatively simple in construction but strong and highly resistant to peeling as a result of internal box pressure. The simplicity of the overall design of the panels and the individual elements of the panels makes it possible to use simplified tooling and automated procedures in the manufacture of the panels to thereby keep the cost of manufacture at an acceptably low level. The cost of manufacture is further reduced by the feature of the method of the invention of requiring only one curing procedure. In addition, the design of panels of the invention makes it possible to keep to a minimum the number of fasteners that extend through the skin and readily lends itself to providing a high degree of resistance to lightning.

These and other advantages and features will become apparent from the detailed description of the best mode for carrying out the invention that follows.

BRIEF DESCRIPTION OF THE DRAWINGS

In the drawings, like element designations refer to like parts throughout; and:

FIG. 1 is a partially schematic pictorial view of a wing/stabilizer box incorporating two panels constructed in accordance with the preferred embodiment of the invention.

FIG. 2 is a simplified end view of the components of the panel before they are assembled and cured together to form the completed panel.

FIG. 3 is a simplified end view of the components shown in FIG. 2 assembled together for curing.

FIG. 4 is a simplified end view of the preferred embodiment of the completed panel.

FIG. 5 is a pictorial view of a section of one of the channels and the tooling used to fabricate the channel.

BEST MODE FOR CARRYING OUT THE INVENTION

The drawings show a panel 2 that is constructed according to the invention and that also constitutes the best mode of the apparatus of the invention currently known to the applicant. The panel 2 shown in the drawings is an integrally stiffened wing/stabilizer box cover panel 2 made from a fiber reinforced composite material. It is anticipated that the construction of wing/stabilizer box cover panels, like the one shown in FIG. 1, will be a major application of the present invention. However, it is of course to be understood that the method and apparatus of the invention may also be applied to great advantage to the construction of other types of structurally reinforced composite material panels.

The completed panel 2 shown in FIGS. 1 and 4 includes a skin 4 and a plurality of longitudinal blade stiffeners 10. The skin 4 is generally in the form of a sheet which has the aerodynamic curvature of the portion of the aircraft into which the panel 2 is to be installed. The blade stiffeners 10 project from the inner surface of the skin 4 and are substantially normal to such inner surface. The skin 4 has a plurality of layers of fiber reinforced composite material. These layers include two groups of layers, an outer group forming an outer skin portion 6 and an inner group forming an inner skin portion 8. The inner surface of the inner skin portion 8 forms the inner surface of the skin 4. Each of the blade stiffeners 10 also has a plurality of layers of fiber reinforced composite material. The layers of composite material forming the panel 2 may be of various types.

An example of a suitable type of composite material is one having an epoxy resin matrix reinforced with graphite fibers.

The reinforcing fibers in the layers of material in the skin 4 and the blade stiffeners 10 are oriented to integrally stiffen the panel 2 and provide resistance to both torsional shear and bending loads on the panel 2. The reinforcing fibers in the layers of the skin 4 are oriented to resist torsional shear on the panel 2. Preferably, the resistance to torsional shear is provided by orienting a relatively high percentage of the fibers at angles of substantially plus and minus 45° to the longitudinal axis of the panel 2. The reinforcing fibers in the layers of the blade stiffeners 10 are oriented to resist bending loads on the panel 2. Preferably, the resistance to bending is provided by orienting a relatively high percentage of the fibers at substantially 0° to the longitudinal axis of the panel 2. In each case, the exact percentages of plus and minus 45° fibers, 0° fibers, and fibers with other orientations, such as 90°, is determined by the loads to which the panel 2 will be subjected.

The completed panel 2 shown in FIGS. 1 and 4 also includes a longitudinal frame member or spar chord 20 on each side of the panel 2. Each of these spar chords 20 projects from the inner surface of the skin 4 and is generally normal to said inner surface. Each spar chord 20 is adjacent to but spaced from one of the side edges of the panel 2. The spar chords 20 differ from the blade stiffeners 10 in that they are longer and deviate further from being precisely normal to the inner surface of the skin 4. Like the blade stiffeners 10, the spar chords 20 have a plurality of layers of composite material with reinforcing fibers oriented to resist bending loads on the panel 2. Preferably, the reinforcing fibers in these layers are predominantly oriented at substantially 0° to the longitudinal axis of the panel 2, which generally coincides with the longitudinal axis of the wing into which the panel 2 is to be incorporated.

In the manufacture of the completed panel 2 described above, the outer skin portion 6 is formed, a plurality of channel-shaped members 12 are formed, and the outer skin portion 6 and the members 12 are cured together to form the main portion of the panel 2 between the spar chords 20. The outer skin portion 6 is formed by laying a plurality of layers of fiber reinforced composite material to form a sheet of such material, orienting the layers to provide the desired resistance to torsional shear, and giving the sheet the desired aerodynamic curvature. The channels 12 are formed by laying a plurality of layers of fiber reinforced composite material for each channel 12, orienting these layers to provide the desired resistance to torsional shear and bending loads, and shaping these layers into an elongated shape having a generally U-shaped cross section with a web portion 14 and two flange portions 16. The channels 12 are positioned longitudinally along the inner surface of the outer skin portion 6, and skin portion 6 and channels 12 are cured together into a single integrated load resisting structure.

It is of course to be understood that the forming of the outer skin portion 6 and the forming of the channels 12 may each be carried out in a number of ways, and that the steps of each forming process may generally be carried out either separately or simultaneously. For example, the laying of the layers of composite material may be accomplished by a fiber reinforced tape laying operation or by a fiber laminating operation in which the fibers are impregnated in a matrix after or during the laminating process, and the shaping in either case may be part of the laying operation or a later separate step. The positioning and curing processes may also be carried out in a number of ways, and the positioning of the channels 12 may be performed separately or as part of one of the forming processes.

In the preferred embodiment of the method of the invention, the layers of the outer skin portion 6 are laid up onto the top surface of a table-like lay-up tool. Preferably, this top surface has a curvature corresponding to the desired aerodynamic curvature of the finished panel 2 so that the desired curvature is imparted to the outer skin portion 6 as the layers of portion 6 are laid onto the tool. The orienting of the fibers in the layers of portion 6 is also achieved as the layers are laid up either by the simple expedient of orienting the plies of tape as they are laid or by using plies of tape having fibers with the desired orientations. Preferably, the tape laying operation is at least semi-automated and the position of the tape laying head is numerically controlled. For example, the tape may be laid up directly onto a compoundly curved mold surface as disclosed in U.S. Pat. No. 4,461,669, granted July 24, 1984, to Helmut Dontscheff.

In the preferred embodiment of the method, the channels 12 are formed separately from the outer skin portion 6. The simple structure of each of the channels 12 permits the use of simplified tooling and procedures that result in relatively rapid forming of the channels 12. The simplified tooling and efficient procedures greatly reduce the cost of manufacture of the channels 12. In addition, the relatively rapid forming helps to prevent undesirable partial curing of the composite material during the forming operation. Such partial curing can significantly degrade the quality of the finished panel 2 by inhibiting full integration of outer skin portion 6 and channels 12 when they are cured together and thereby reducing the peel resistance of the finished panel 2.

Since the finished panel 2 has a compound curvature, with the curvature varying in both the lateral and longitudinal directions, each of the channels 12 has a slightly different configuration. Therefore, each channel 12 requires different lay-up tooling. Referring to FIG. 5, the tooling for each channel 12 includes a channel-shaped mandrel 30 and an elastomeric cover or caul 32 for the mandrel 30. The mandrel 30 and caul 32 are shaped to fit together as shown in FIG. 5. The mandrel 30 is fabricated from graphite/epoxy composite material that is laid up on a metal male mold and then cured. The caul 32 is made from a silicone rubber that is poured into a two-part closed mold and then is cured in such mold. The layers or plies of composite material that form the channel 12 are laid up onto the tooling 30,32 over the outer surface of the caul 32, as shown in FIG. 5. Some of the plies extend up one side of the caul 32, across the top, and down the other side. Other plies are limited to the sides of the lay up. Therefore, in the finished channel 12, the flanges 16 have more plies and are thicker than the web 14. As the plies of the channel 12 are laid onto the tooling 30, 32, they are bagged and compacted to form them over the tooling 30, 32 and remove any air pockets between the plies. FIG. 5 shows in phantom a bag 34 compacting plies of composite material over the elastomeric caul 32 and mandrel 30. Preferably, the forming of the channels 12, including the compacting of the plies, is at least partially automated. For example, the channels 12 may be formed in accordance with the method disclosed in U.S. Pat. No.

4,475,976, granted Oct. 9, 1984, to R. F. Mittelstadt et al.

The different channels 12 and the outer skin portion 6 may be formed simultaneously or at different times depending on the facilities and personnel available. If the parts are formed at different times, the parts that are formed first are placed in a freezer to await the completion of the formation of the other parts. This prevents the undesirable partial curing of the parts discussed above due to prolonged exposure to the air at room temperature. When all of the channels 12 and the outer skin portion 6 for a particular panel 2 have been formed, they are assembled together and cocured in an autoclave to form an integrated structure.

When the channels 12 are positioned on the outer skin portion 6, the webs 14 of channels 12 are placed in a contiguous relation with the inner surface of the skin portion 6 and in a laterally contiguous relation with each other. By this arrangement, the main center part of the inner skin portion 8 of the panel skin 4 is formed by the webs 14 of the channels 12. The positioning of the channels 12 also brings the adjacent flanges 16 of each pair of adjacent channels 12 into a laterally contiguous relation with each other. Each pair of adjacent flanges 16 forms one of the blade stiffeners 10. The curing together of the outer skin portion 6 and the channels 12 merges the matrices of the composite material forming the outer skin portion 6 and the channels 12 to form a single integrated load resisting structure. FIG. 2 illustrates the channels 12 and outer skin portion 6 during assembly. FIG. 3 illustrates the assembled components 6,12 ready for the curing process. FIG. 4 shows the integrated structure of the completed panel 2.

Each side or boundary portion of the panel 2—the portion on the side of the panel 2 from the spar chord 20 to the side edge of the panel 2—is formed along with the main center portion of the panel 2 from which the blade stiffeners 10 project. Each boundary portion includes an outer skin portion that is formed by a part of the outer skin portion 6 which extends laterally beyond the laterally outermost channel-shaped member 12' on each side of the panel 2. Each boundary portion also includes an inner skin portion that is a continuation of the inner skin portion 8 of the center of the panel 2. The corresponding spar chord 20 projects from and is generally normal to the inner surface of the inner skin portion 8 at the junction of the boundary portion and the main center portion of the panel 2.

The completed structure of each boundary portion of the panel 2 is obtained by joining the outer skin portion 6, a modified flange 16' of the laterally outermost channel 12', and an L-shaped member 22. These elements are cured together when the outer skin portion 6 and channels 12 are cured together to form the single integrated load resisting panel 2. Like the channels 12,12', the L-shaped members 22 are formed by laying a plurality of layers of fiber reinforced composite material for each member 22, orienting the reinforcing fibers in the layers to resist torsional shear and bending loads, and shaping the layers into a desired configuration. The steps of the formation of the L-shaped members 22, like the steps of the formation of the channels 12,12', may be performed either separately or simultaneously. Each completed L-shaped member 22 is positioned to extend longitudinally along the inner surface of the outer skin portion 6, preferably at the same time that the channels 12,12' are positioned.

The configuration of each member 22 has a two-legged, generally L-shaped cross section. When the member 22 is positioned on the outer skin portion 6, one leg 24 is placed in a contiguous relation with the inner surface of the outer skin portion 6 and a laterally contiguous relation with the web 14 of the adjacent channel 12'. This arrangement results in the leg 24 of the L-shaped member 22 forming an integral part of the inner skin portion 8 of the completed panel 2. The other leg 26 of the L-shaped member 22 is placed in a laterally contiguous relation with the adjacent flange 16' of the adjacent channel 12' to form, with said flange 16', the spar chord 20.

For the purpose of forming the spar chord 20, the laterally outermost flange 16' of the laterally outermost channel 12' is formed differently from the flanges 16 of the channels 12 and the other flange 16 of the modified channel 12'. The modified flange 16' is longer than the unmodified flanges 16 and is oriented at an angle of more than 90° to the web 14 of the channel 12' to coincide with the plane of the spar chord 20.

There is a tendency for porosity or voids to develop in the panel 2 at the junction of two flanges 16 and outer skin portion 6, and at the junction of a modified flange 16', a leg 26, and outer skin portion 6. Any porosity or voids in the panel 2 are, of course, undesirable since they decrease the strength of the panel 2. Therefore, in order to prevent porosity or voids from developing, the method preferably also includes filling such junction areas with robing 28 made from twisted graphite fibers impregnated with resin. The robing 28 is positioned during assembly of outer skin portion 6, channels 12,12', and members 22 and is cured therewith to become an integral part of completed panel 2.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the invention as defined by the following claims.

What is claimed is:

1. A method of producing an integrally stiffened panel for use in an aircraft, comprising:
    forming an outer skin portion; including laying a plurality of layers of fiber reinforced composite material onto a top surface of a lay-up tool which forms a mold surface having a curvature corresponding to the desired curvature of the finished panel, and orienting reinforcing fibers in said layers to resist torsional shear on the panel;
    forming a plurality of channel-shaped members; including laying a plurality of layers of fiber reinforced composite material for each member, shaping said layers for each member into an elongated shape having a generally U-shaped cross section with a web portion and two flange portions, and orienting reinforcing fibers in said flange portions to resist bending loads on the panel and reinforcing fibers in said web portion to resist torsional shear on the panel;
    positioning the formed channel-shaped members longitudinally along the inner surface of the formed outer skin portion with the web portions contiguous to said inner surface and each other and adjacent flange portions contiguous to each other; and curing the outer skin portion and the channel-shaped members together into a single integrated load resisting structure, and allowing the outer skin portion and the web portions of the channel-shaped members to form an integrated skin and allowing each pair of adjacent flange portions to form a stiffener projecting from the inner surface of said skin.

2. A method as recited in claim 1, in which the step of orienting said fibers in the outer skin portion includes orienting at least some of said fibers at angles of substantially plus and minus 45° to the longitudinal axis of the panel, and the step of orienting said fibers in said flange portions includes orienting at least some of said fibers at substantially 0° to said axis.

3. A method as described in claim 1:
which further comprises forming two L-shaped members; including laying a plurality of layers of fiber reinforced composite material for each L-shaped member, shaping said layers for each L-shaped member into an elongated shape having a generally L-shaped cross section with a web portion and a flange portion, and orienting reinforcing fibers in said flange portion to resist bending loads on the panel and reinforcing fibers in said web portion to resist torsional shear on the panel; and
positioning the formed L-shaped members longitudinally along the inner surface of opposite sides of the formed outer skin portion with the web portions of the L-shaped members contiguous to said inner surface and the flange portion of each L-shaped member contiguous to a flange portion of an adjacent one of said channel-shaped members; and in which the step of curing the outer skin portion and the channel-shaped members together includes curing the L-shaped members together with the outer skin portion and the channel-shaped members into a single integrated load resisting structure, and allowing the web portions of the L-shaped members to form a part of said integrated skin and allowing each flange portion of the L-shaped members to form, with the contiguous flange of said adjacent channel-shaped member, a longitudinal frame member projecting from the inner surface of said skin.

* * * * *